United States Patent
Heger et al.

(10) Patent No.: US 10,184,543 B2
(45) Date of Patent: Jan. 22, 2019

(54) BALANCING WEIGHTS WITH MULTI LAYER ADHESIVE TAPE

(71) Applicant: Wegmann automotive GmbH & Co. KG, Veitshöchheim (DE)

(72) Inventors: Ingo Heger, Würzburg (DE); Felix Bode, Veitshöchheim (DE)

(73) Assignee: WEGMANN AUTOMOTIVE GMBH & CO. KG, Vietshochheim (DE)

( * ) Notice: Subject to any disclaimer, the term of this patent is extended or adjusted under 35 U.S.C. 154(b) by 0 days.

(21) Appl. No.: 15/809,522

(22) Filed: Nov. 10, 2017

(65) Prior Publication Data

US 2018/0066730 A1    Mar. 8, 2018

Related U.S. Application Data (60) Division of application No. 14/471,034, filed on Aug. 28, 2014, which is a continuation of application No.
(Continued)

(30) Foreign Application Priority Data

Aug. 30, 2012    (EP) .................................. 12182444

(51) Int. Cl.
*B32B 38/10*    (2006.01)
*F16F 15/32*    (2006.01)
(Continued)

(52) U.S. Cl.
CPC .......... *F16F 15/328* (2013.01); *F16F 15/324* (2013.01); *F16F 15/345* (2013.01);
(Continued)

(58) Field of Classification Search
CPC . B32B 38/10; B32B 43/006; Y10T 156/1184; Y10T 156/1961; Y10T 156/1967
(Continued)

(56) References Cited

U.S. PATENT DOCUMENTS 3,177,039 A    4/1965    Skidmore
6,364,421 B1   4/2002    Pursley ........................ 301/5.21
(Continued)

FOREIGN PATENT DOCUMENTS

DE            2522149 A1    11/1976
DE    10 2007 050 528      4/2009
(Continued)

OTHER PUBLICATIONS

Extended European Search Report in European Application No. 12182442.9 dated Jan. 30, 2013.
(Continued)

*Primary Examiner* — Mark A Osele
*Assistant Examiner* — Nickolas R Harm
(74) *Attorney, Agent, or Firm* — Norton Rose Fulbright US LLP (57) ABSTRACT

Balancing weights for cars have an adhesive tape with at least a first tape layer and a second tape layer, for attaching the balancing weights to a rim. The first tape layer is held in close proximity to a rim by a first adhesive layer. The second tape layer is held in close proximity to the balancing weights by a second adhesive layer. The first tape layer is stiffer and less flexible than the second tape layer, the second tape layer is softer and more flexible than the first tape layer. This allows easy removal of the balancing weights from the rim by pushing a wedge shaped tool between the first tape layer and the rim.

19 Claims, 5 Drawing Sheets

Related U.S. Application Data

PCT/EP2013/054078, filed on Feb. 28, 2013, which is a continuation-in-part of application No. 13/408,183, filed on Feb. 29, 2012.

(51) Int. Cl.
  *F16F 15/34* (2006.01)
  *B32B 43/00* (2006.01)

(52) U.S. Cl.
  CPC ............ *B32B 38/10* (2013.01); *B32B 43/006* (2013.01); *F16F 2230/0005* (2013.01); *F16F 2230/0011* (2013.01); *Y10T 156/11* (2015.01); *Y10T 428/24868* (2015.01); *Y10T 428/28* (2015.01)

(58) Field of Classification Search
  USPC ........................................ 156/717, 761, 762
  See application file for complete search history.

(56) References Cited

U.S. PATENT DOCUMENTS

| | | | |
|---|---|---|---|
| 6,413,626 | B1 | 7/2002 | Wollner ..................... 428/317.3 |
| 2005/0104438 | A1 | 5/2005 | Petchel et al. ............... 301/5.21 |
| 2006/0273652 | A1 | 12/2006 | Winch et al. ................ 301/5.21 |
| 2009/0243370 | A1 | 10/2009 | Peniche et al. .............. 301/5.21 |

FOREIGN PATENT DOCUMENTS

| | | |
|---|---|---|
| EP | 1 613 876 B1 | 1/2006 |
| FR | 2 909 150 | 5/2008 |
| GB | 1 501 781 | 2/1978 |
| JP | S58-152612 | 9/1983 |
| JP | S60-229977 | 11/1985 |
| JP | 3019263 | 12/1995 |
| JP | 2002-508487 | 3/2002 |
| JP | 2010-540732 | 12/2010 |
| KR | 2001-0033000 | 4/2001 |
| RU | 2160932 C1 | 12/2000 |
| WO | WO/92/000471 | 1/1992 |
| WO | WO/99/031406 | 6/1999 |
| WO | WO/99/031407 | 6/1999 |
| WO | WO/07/116166 | 10/2007 |

OTHER PUBLICATIONS

Extended European Search Report in European Application No. 12182444.5 dated Jan. 30, 2013.
International Preliminary Report on Patentability in International Application No. PCT/EP2013/054078 dated Sep. 2, 2014.
International Search Report and Written Opinion in International Application No. PCT/EP2013/054078 dated Jun. 7, 2013.
Notification of Reasons for Refusal in Japanese Patent Application No. 2014-559223 dated Oct. 17, 2016 (English translation included).
Office action in Japanese Patent Application No. 2014-559223 dated May 29, 2017.
Office Action issued in corresponding Korean Application No. 10-2017-7026383, dated Oct. 2, 2018.

BALANCING WEIGHTS WITH MULTI LAYER ADHESIVE TAPE

PRIORITY CLAIM

This application is a divisional of U.S. application Ser. No. 14/471,034 filed on Aug. 28, 2014, which is a continuation of International Application No. PCT/EP2013/054078 filed on 28 Feb. 2013 and designates the United States, which International Application claims priority to European Application No. 12182444.5 filed on Aug. 30, 2012, and is a continuation-in-part of U.S. application Ser. No. 13/408,183 filed on Feb. 29, 2012. The contents of each of the foregoing applications are incorporated by reference in their entireties.

BACKGROUND OF THE INVENTION

1. Field of the Invention

The invention relates to balancing weights and belts of balancing weights with adhesive tapes.

2. Description of Relevant Art

In automotive wheel balancing, individual wheel balancing weights are applied to specific positions of a rim. Basically, two types of balancing weight are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Before starting a new balancing process, old balancing weights have to be removed. After removing adhesive balancing weights, in most cases a residue remains at the rim. With time, this collects further dust and becomes unsightly. A solutions is disclosed in WO 99/31407 A1, using a polymer film with a removal tab and foam layers on both sides. By pulling the tab, the foam layers can be pulled out between the balancing weight and the rim. The drawback is that a tab showing under the balancing weight is not desired. Another solution is disclosed in WO 99/31406 A1, there the adhesive tape has a higher adhesive strength to the wheel weight than to rim. This requires a complex adhesive tape system with at least two different types of adhesive.

A rotatable tool for removing balancing weights is disclosed in DE 10 2007 050 528 A1.

A balancing weight comprising a strand of mass material is disclosed in DE 25 22 149.

SUMMARY OF THE INVENTION

The embodiments are based on the object of providing a balancing weight or balancing weights and a belt of balancing weights, which can be easily removed from a rim of a wheel without leaving any residue and without using a complex tool. Furthermore, the balancing weights should be inexpensive and simple.

In an embodiment, at least one balancing weight is attached to an adhesive tape. The adhesive tape has at least two different tape layers of different mechanical properties. A first tape layer is provided for being held in close proximity to a rim. It is preferably held by a first adhesive layer. A second tape layer is held in close proximity to the balancing weight. It is preferably held by a second adhesive layer. It is furthermore preferred to have a liner for protecting the adhesive surface of the first adhesive layer, directed to the rim. The liner has to be removed before applying the balancing weight to the rim. To allow for an easy and residue less removal, the first tape layer is stiffer and less flexible than the second tape layer. The second tape layer is softer and more flexible than the first tape layer and allows for compensation of mechanical tolerances and or uneven surfaces. The first tape layer is preferably held at the second tape layer by a third adhesive layer. Alternatively, melting, extruding or any other kind of fixing the layers together may be usable. The balancing weights mentioned herein are generally for balancing of wheels, preferably for balancing of vehicle wheels and most preferably for car or motorbike wheels.

In a preferred embodiment, the first tape layer and the second tape layer are of one piece. This may be done by generating a material having a higher density in the area of the first tape layer and the lower density in the area of the second tape layer. For example, the same piece of material may be non-foam for me first tape layer and may have a foam structure for the second tape layer.

In an alternate embodiment, the first tape layer has a higher tensile strength than the second tape layer. It is preferred, if the second tape layer has a higher elasticity than the first tape layer.

In both embodiments, the balancing weight may easily be removed from the rim. A method of removing, preferably comprises to press a preferably wedge shaped tool between the balancing weight and the rim. The tool may be a simple plastic wedge. It may be driven by hammering. Due to the higher flexibility or higher elasticity of the second tape layer, there is a certain probability, that the tool splits the second layer or at least rips the balancing weight off the second layer. So the balancing weight can be removed from the rim. For the case, the balancing weights are connected to each other, for example by connecting elements, the balancing weights may be removed in one piece. There is the first tape layer remaining at the rim. Due to its higher stiffness or higher tensile strength, the first tape layer can be removed in one piece from the rim. In cases, where the tool penetrates below the first tape layer, the first tape layer may be removed together with the balancing weights, preferably in one piece.

In a further embodiment, there is at least one support layer provided to stabilize the balancing weights. Preferably, this support layer is a rigid or semi-rigid layer. This layer may be a sheet, foil, or tape of any material, preferably of metal (e.g. steel or aluminum) or a reinforced plastic material. Most preferably, this layer comprises a glass fiber or carbon fiber reinforced plastic material. This layer may also comprise a grid or mesh which may also be of metal or plastic, preferably a glass or carbon fiber reinforced plastic. This layer gives the whole assembly of tapes and weights some stiffness and prevents bending when the belt comprising of the tape and the balancing weights is transported from a dispenser and handed over to a robot or a person for being attached to a wheel rim.

In a preferred embodiment, the tape has at least two tape layers of different materials, preferably two different foam layers. For example the first tape layer may comprise Polyethylene (PE) while the second tape layer may comprise Polyurethane (PU). Preferably a PU foam is used, which is comparatively soft and a ductile. The properties of this foam allow for compensation of variations of the surface of the rim (leveling). It is preferred, if the PU foam has a density of 500 kg/m3 with a tolerance of 20%, most preferably 10% above and below this value. At least another layer of PE foam is comparatively stiff and has a comparatively high shear force. This makes the whole belt of the balancing weights and the tapes comparatively stiff, so that a section of a plurality of balancing weights attached to a piece of tape may be handled as one piece. It may be sufficient to grip manually or by a robot only one of the plurality of balancing weights for handling and transporting the whole piece. It is preferred, if the PE foam has a density of 200 kg/m3 with a tolerance of 20%, most preferably 10% above and below this value.

In another embodiment, the layers may have different thickness. It is preferred if the first layer is thinner than the second layer. Preferably another layer has twice the thickness of the first layer. The thickness of the layers may be in a range from 0.01 mm to 5 mm.

In a further embodiment the layers may have different densities, preferably different foam densities. It is preferred, if the densities are in a range from 10 kg/m3 to 2000 kg/m3.

Preferably the first tape layer film has a mechanical strength and most preferably a tensile strength which is sufficient to pull the first tape layer together with the other layers and preferably with at least one balancing weight off the rim. This allows for easy removal of the balancing weights and the adhesive tape without damaging and without leaving adhesive tape residues at the rim surface. Without such a base film, in most cases, at least one of the foam layers breaks during removal, often causing pieces of the foam layer and other layers remaining at the rim. The base film protects the softer foam layers from getting torn.

It is further preferred, if at least one of the layers, preferably a layer close to the bottom of the adhesive tape, most preferably the first tape layer bears some marking. This marking may be text, letters, numbers or even a bar code or any image. It may provide information for identifying the type of balancing weight, the manufacturing date, the manufacturer, or any other information. Marking of the layer may be done by stamping, printing, cutting, etching or by laser writing. Such marking allows a higher density of information than molding or engraving any marking on the surface of the balancing weight. Furthermore the marking process of the base film is cheaper and more flexible compared to marking of a balancing weight. The marking of the base film may change between individual balancing weights like a serial number changes from weight to weight. For the case, there is any further layer covering this marking, preferably this layer is transparent. Such a marking is preferred over a marking of the liner, as it allows easy identification of balancing weights, even with removed liner. A marked liner may no more be available when the balancing weights have been prepared for immediate application to rim or after used balancing weights have been removed from the rim.

It is further preferred, if at least one of the surfaces of the layers has acrylate adhesive on a surface. Such an adhesive may increase mechanical strength of the adhesive tape and/or may prevent separation of the different layers.

In a further embodiment, the first adhesive layer and the second adhesive layer have similar adhesive strengths. Most preferably, they have the same adhesive strength. It is further preferred, if the first adhesive layer and the second adhesive are of the same material.

In another embodiment, there may be an opening, which may be a punching at least one of the tapes. There may be a metal part, preferably a magnetic part in such an opening. This may be used for automatic handling of the balancing weights together with the tapes. The opening may further be used to apply a vacuum for gripping the balancing weights and the tapes. It is further preferred, if at least one of the tapes has a through hole.

Furthermore, there may be magnetic particles in at least one of the layers, preferably in the base film. Alternatively, magnetic, particularly permanently magnetic, ribs can also be threaded into the base film. This facilitates handling of the balancing weight, because the adhesive balancing weight is easier to grip. If at least one of the layers, preferably the base film is embodied as magnetic, the adhesive balancing weight is also suitable for automated application, due to its magnetic support. In this case, it is not necessary to wait for the adhesive, or for the development of the adhesive effect thereof. The adhesive balancing weight is held securely in position, even immediately after its attachment to a magnetic adhesive surface.

In a further embodiment, a balancing weight has an adhesive tape for attaching the balancing weight to a rim. The adhesive tape has at least a second tape layer which bears at least a visible marking and a second adhesive layer, which is transparent for holding the adhesive tape to the rim. Therefore the visible marking can be read through the transparent second adhesive layer.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
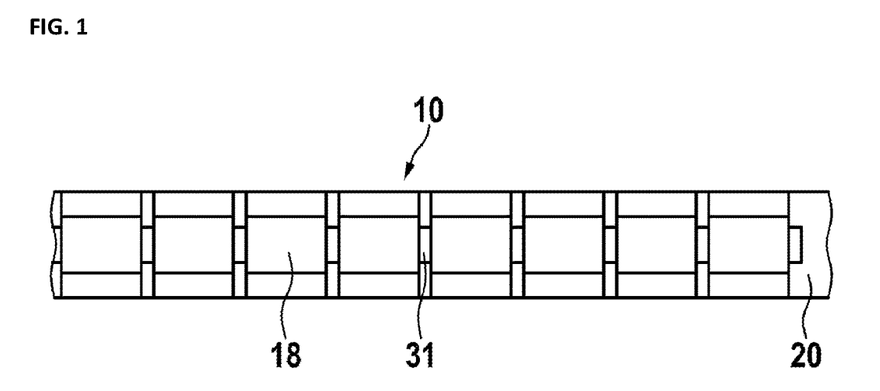
FIG. 1 shows a first embodiment of a balancing weight.

In FIG. 1, a preferred embodiment is shown. A balancing weight 10 may comprise a plurality of individual weights segments 18, which are preferably into connected by connecting elements 31. According to the actual required weight, a number of connected weight segments may be applied to the rim of a wheel.

Figure 2:
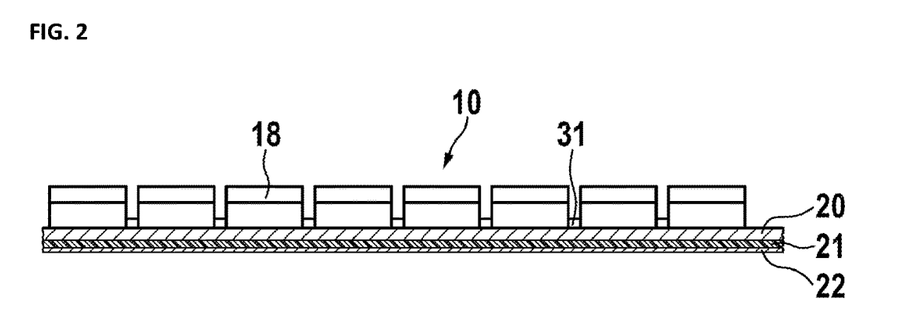
FIG. 2 shows the balancing weights in a side view.

In FIG. 2, the previous balancing weight is shown in a side view. Here, the balancing weight is supported by second tape layer 20, first tape layer 21 and liner 22. The liner has to be removed before applying the balancing weight to a rim.

The first tape layer 21 preferably acts as support layer and preferably is a rigid or semi-rigid layer. Preferably this layer comprises foam having higher stiffness and shear force compared to the second tape layer. Most preferably this layer comprises PE (Polyethylene) foam or film. The second tape layer 20 preferably acts as leveling layer and therefore preferably comprises foam having lower stiffness than the first tape layer. Most preferably this layer comprises PU (Polyurethane) foam. There may be a further support layer (not shown here) between the second tape layer 20 and the first tape layer 21. Depending on the requirements the properties of second tape layer 20 and first tape layer 21 may also be exchanged. There may also be a softer layer above and another softer layer below a stiffer layer stabilizing the assembly, while the softer layers are leveling and compensation for tolerances of the balancing weight and the rim.

Figure 3:
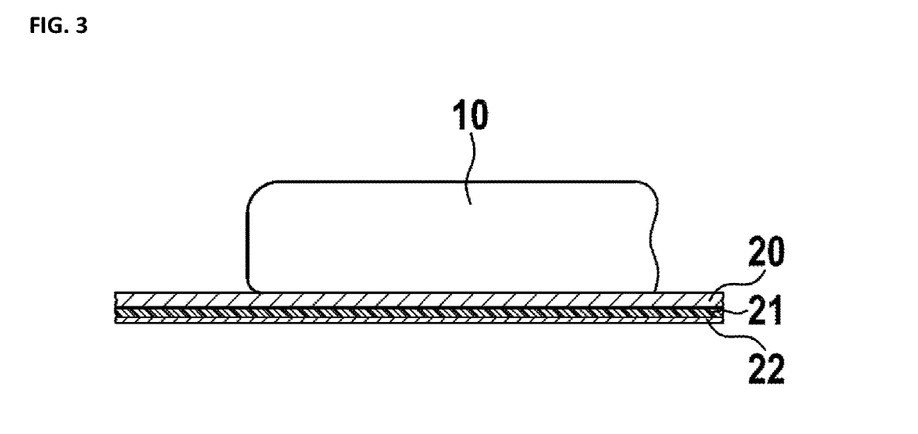
FIG. 3 shows balancing weight tape layers.

In FIG. 3, a balancing weight is shown on the tape layers in detail. The balancing weight 10 is attached to the second tape layer 20. Below this second tape layer 20 is first tape layer 21. This is furthermore protected by liner 22.

Figure 4:
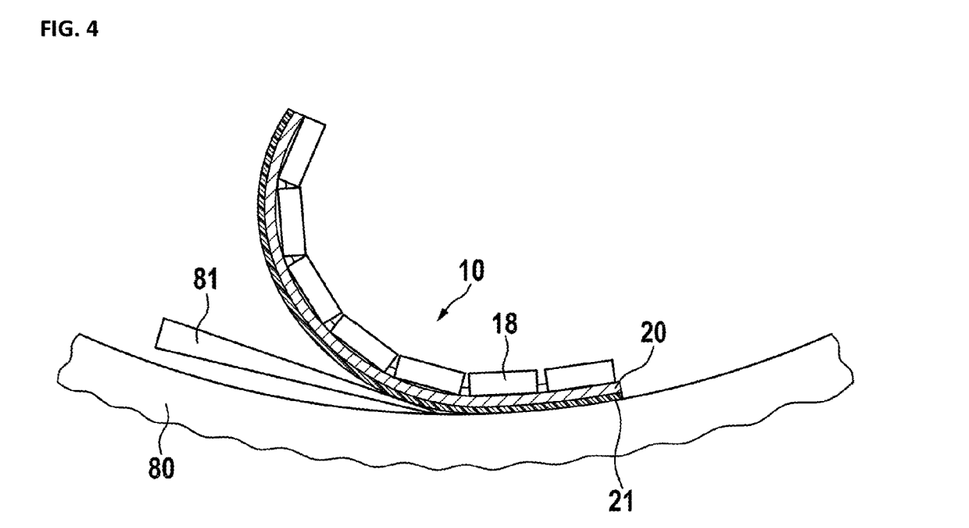
FIG. 4 shows a first method of removing balancing weights

In FIG. 4, removal of a balancing weight is shown. A tool 81, which preferably is wedge shaped is pushed under the balancing weight 10, therefore ripping the segments of the balancing weight off the rim 80. It is preferred to have a sharp tool, which may penetrate under the first tape layer 21. Preferably the tool it comprises a plastic material or at least a material which is softer than the rim to prevent damages of the rim or its surface. Due to the properties of the first tape layer 21 and the connecting elements 31 connecting individual balancing weight segments, the balancing weight 10 may be removed in one piece. Removing of balancing weights in one piece simplifies cleaning and discarding of the balancing weights.

Figure 5:
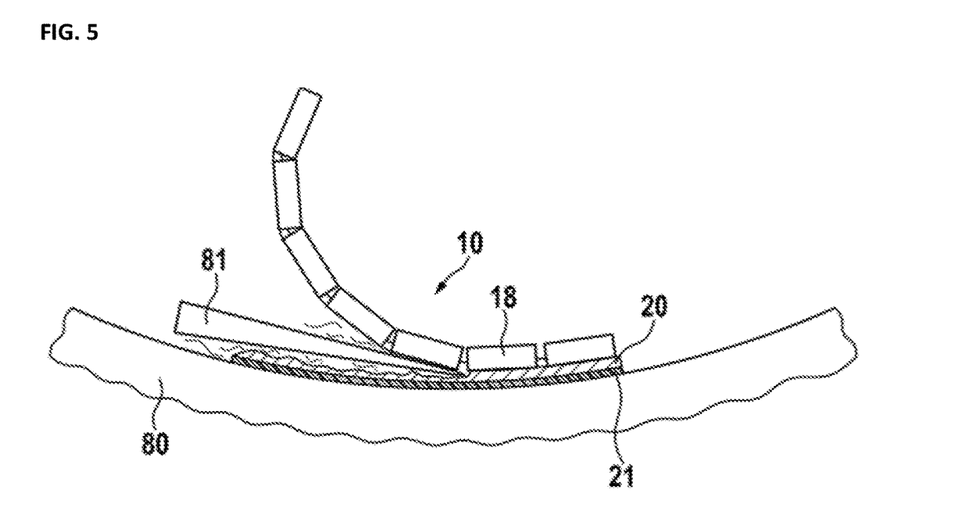
FIG. 5 shows the first step of a second method of removing balancing weights

In FIG. 5, a second method of removing a balancing weight is shown. Here, the tool 81 is inserted under the balancing weight 10, either splitting the second tape layer 20 or separating the second tape layer 20 from the individual balancing weight segments. Due to the connecting elements 31 between the balancing weight segments, the balancing weight may be removed in one piece. After the step at least parts of the adhesive tape remains at the rim.

Figure 6:
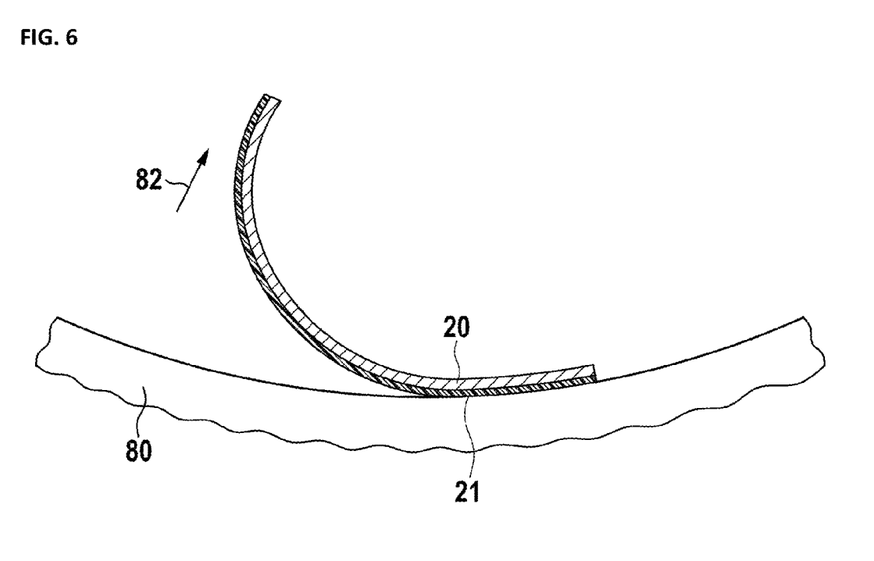
FIG. 6 shows the second step of a second method of removing balancing weights

In FIG. 6, the second step of the second method is shown. Here, the remaining layers of the adhesive tape is pulled off, preferably by applying force into a direction 82. Due to the properties of the first tape layer, this may be pulled off in one piece further holding remaining parts of other layers of the adhesive tape.

Figure 7:
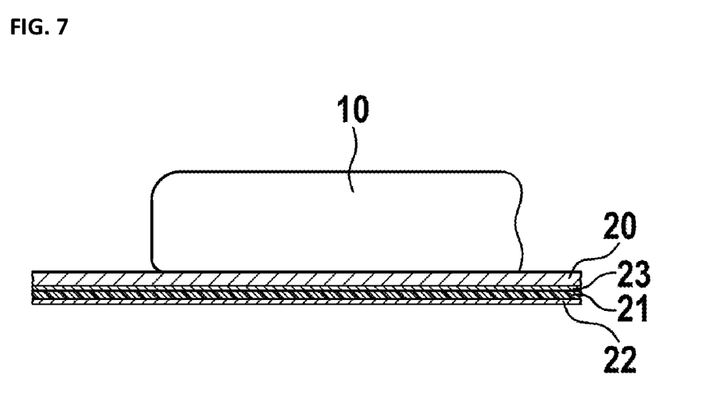
FIG. 7 shows a different set of layers in detail.

In FIG. 7, a different set of layers is shown in detail. A balancing weight 10 is attached to second tape layer 20. Below this layer is support layer 23 which comprises of a comparatively stiff material. Below this layer is first tape layer 21, which preferably comprises a comparatively soft material for leveling. This is furthermore protected by liner 22.

Figure 8:
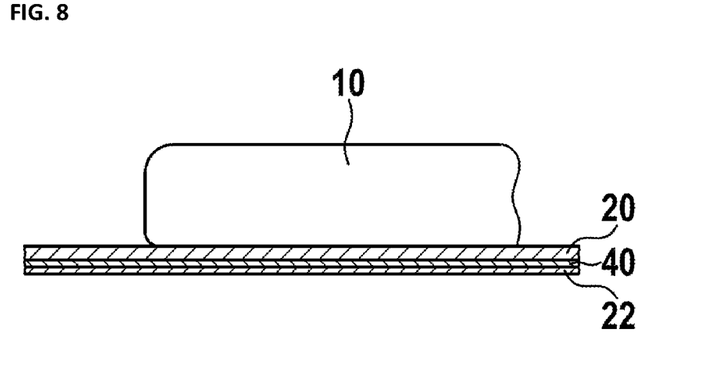
FIG. 8 shows a different set of layers with a base film.

In FIG. 8 a different set of layers with a base film is shown. Here a base film 40 is arranged below second tape layer 20. Preferably second tape layer 20 comprises a comparatively soft material which is protected by the base film 40. Preferably the base film has a mechanical strength and most preferably a tensile strength which is sufficient to pull the base film together with the other layers and preferably with at least one balancing weight off the rim. This allows for easy removal of the balancing weight and the adhesive tape without damaging and without leaving adhesive tape residues at the rim surface. Without such a base film, in most cases, at least one of the foam layers breaks during removal, often causing pieces of the foam layer and other layers remaining at the rim. The base film protects the softer foam layers from getting torn. The base film may be used in any combination with the layers disclosed herein.

Figure 9:
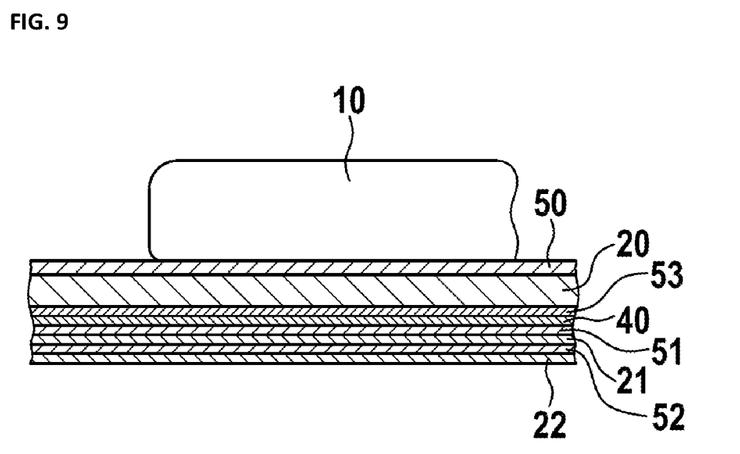
FIG. 9 shows a different set of layers with a further base film.

In FIG. 9, an embodiment with a further base film 40 is shown. The base film 40 is connected to the second tape layer 20 by means of fourth adhesive layer 53.

Figure 10:
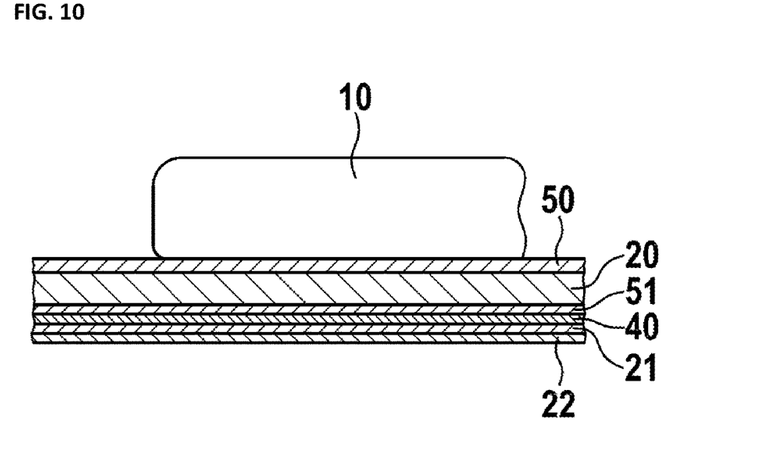
FIG. 10 shows a preferred embodiment with adhesive layers in detail.

In FIG. 10, a preferred embodiment is shown in detail together with adhesive layers. This figure refers to the assembly of FIG. 3. Here in addition adhesive layers 50, 51, 52 are shown. The second adhesive layer 50 fixes a balancing weight 10 to the second tape layer 20. Furthermore first adhesive layer 52 is used to hold the first tape layer 21 and therefore, the whole assembly including all layers and the balancing weight to a rim. This adhesive layer is protected by liner 22. Herein for simplicity the term adhesive layer is used. These adhesive layers are different from the further layers like second tape layer 20, first tape layer 21 or support layer 23. The main function is to connect neighboring layers, or to hold the assembly to a rim. Generally an adhesive layer may comprise of a thin film of adhesive, preferably of an acrylate. Some of the layers, preferably second tape layer 20 and first tape layer 21 may be connected by other means like melting or laminating to neighboring layers or balancing weights.

Figure 11:
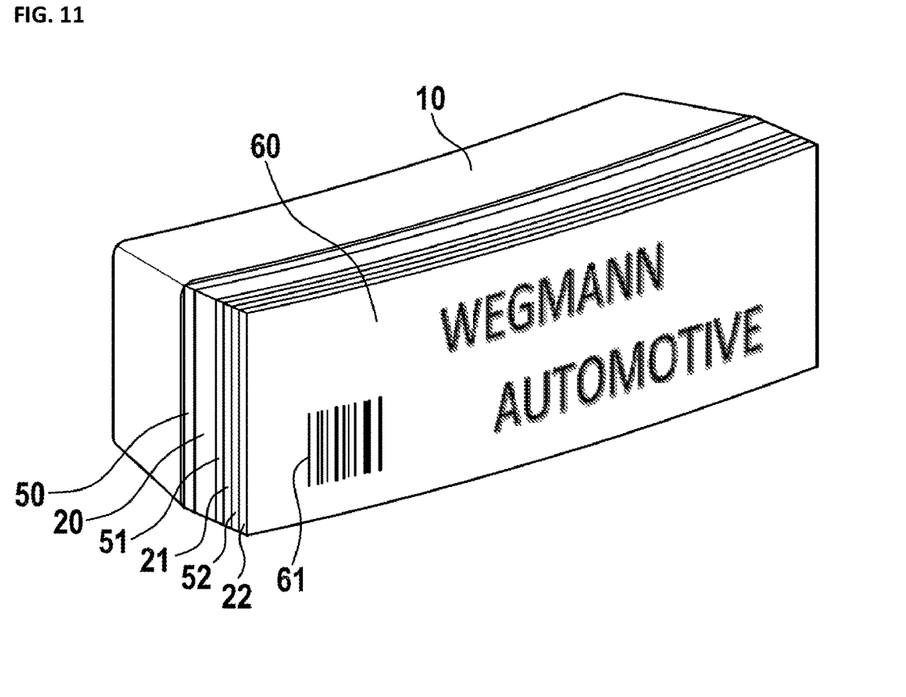
FIG. 11 shows further embodiment with visible marking.

In FIG. 11 an embodiment similar to FIG. 10 is shown. Here the first tape layer 21 has some marking like a text 60 identifying the manufacturer or a bar code 61. In this preferred embodiment the first adhesive layer 52 and the liner 22 are transparent. In the case of a non-transparent liner, the marking will become visible after the liner has been removed.

It will be appreciated to those skilled in the art having the benefit of this disclosure that this invention is believed to provide balancing weights for vehicles and methods for removing such balancing weights from the rim of a wheel. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 balancing weight
11 trapezoidal balancing weight
17 bending direction
18 individual balancing weights
20 second tape layer
21 first tape layer
22 liner
23 support layer
31 connecting element
40 base film
50 second adhesive layer
51 third adhesive layer
52 first adhesive layer 53 fourth adhesive layer
60 marking
61 barcode
80 rim of a wheel
81 tool
82 direction of force

The invention claimed is:

1. Method for removing a balancing weight from a rim, the balancing weight comprising an adhesive tape attaching the balancing weight to a rim, the adhesive tape further comprising:
   a first tape layer configured to be coupled to the rim by a first adhesive layer; and
   a second tape layer coupled to the balancing weight by a second adhesive layer;
   wherein the first tape layer is stiffer and less flexible than the second tape layer, and the second tape layer is softer and more flexible than the first tape layer; and
   wherein the first adhesive layer and the second adhesive layer have the same adhesive strength; and
   wherein the method comprises the steps of:
   pressing a wedge-shaped tool under the first tape layer,
   ripping the first tape layer, together with at least the second tape layer and the balancing weight, off the rim,
   removing the tape layers and balancing weight in one piece.

2. Method according to claim 1, wherein the balancing weight comprises a plurality of individual weight segments interconnected by connecting elements.

3. Method according to claim 1, wherein the first tape layer comprises a film and the second tape layer comprises a foam.

4. Method according to claim 1, wherein the first tape layer comprises a Polyethylene foam.

5. Method according to claim 1, wherein the first adhesive layer and the second adhesive layer are of the same material.

6. Method according to claim 1, wherein the second tape layer comprises a Polyurethane foam.

7. Method according to claim 1, wherein the second tape layer bears at least a visible marking.

8. Method according to claim 1, wherein the second adhesive layer is transparent.

9. Method according to claim 1, wherein the second tape layer bears magnetic particles or parts.

10. Method for removing a balancing weight from a rim, the balancing weight comprising an adhesive tape attaching the balancing weight to a rim, the adhesive tape further comprising:
    a first tape layer configured to be coupled to the rim by a first adhesive layer; and
    a second tape layer coupled to the balancing weight by a second adhesive layer;
    wherein the first tape layer is stiffer and less flexible than the second tape layer, and the second tape layer is softer and more flexible than the first tape layer; and
    wherein the first adhesive layer and the second adhesive layer have the same adhesive strength; and
    wherein the method comprises the steps of:
    pressing a wedge-shaped tool between the balancing weight and the first tape layer,
    splitting the second tape layer or ripping the second tape layer off the balancing weight,
    removing the balancing weight, and
    removing the first tape layer in one piece.

11. Method according to claim 10, wherein the balancing weight is removed in one piece.

12. Method according to claim 10, wherein the balancing weight comprises a plurality of individual weight segments interconnected by connecting elements.

13. Method according to claim 10, wherein the first tape layer comprises a film and the second tape layer comprises a foam.

14. Method according to claim 10, wherein the first tape layer comprises a Polyethylene foam.

15. Method according to claim 10, wherein the first adhesive layer and the second adhesive layer are of the same material.

16. Method according to claim 10, wherein the second tape layer comprises a Polyurethane foam.

17. Method according to claim 10, wherein the second tape layer bears at least a visible marking.

18. Method according to claim 10, wherein the second adhesive layer is transparent.

19. Method according to claim 10, wherein the second tape layer bears magnetic particles or parts.

* * * * *